(12) United States Patent
Fuehrer

(10) Patent No.: US 9,625,263 B2
(45) Date of Patent: Apr. 18, 2017

(54) METHOD AND SYSTEM FOR ASCERTAINING AT LEAST ONE ROAD-RELATED INFORMATION ITEM

(71) Applicant: Robert Bosch GmbH, Stuttgart (DE)

(72) Inventor: Thomas Fuehrer, Stuttgart-Weilimdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/714,965

(22) Filed: May 18, 2015

(65) Prior Publication Data

US 2015/0330794 A1    Nov. 19, 2015

(30) Foreign Application Priority Data

May 16, 2014    (DE) .................. 10 2014 209 281

(51) Int. Cl.
*G01C 21/20* (2006.01)
*G01C 21/26* (2006.01)
*G08G 1/01* (2006.01)
*G08G 1/095* (2006.01)

(52) U.S. Cl.
CPC .............. *G01C 21/20* (2013.01); *G01C 21/26* (2013.01); *G08G 1/0112* (2013.01); *G08G 1/0137* (2013.01); *G08G 1/095* (2013.01)

(58) Field of Classification Search
CPC ........ G01C 21/20; G01C 21/26; G08G 1/095; G08G 1/0137; G08G 1/0112

USPC ......................................................... 701/409
See application file for complete search history.

(56) References Cited

U.S. PATENT DOCUMENTS

| | | | | |
|---|---|---|---|---|
| 2011/0037619 | A1* | 2/2011 | Ginsberg | G08G 1/095 340/910 |
| 2011/0136461 | A1* | 6/2011 | Hauser | H04M 1/72527 455/334 |
| 2014/0129121 | A1* | 5/2014 | Fino | G01C 21/34 701/117 |
| 2014/0336913 | A1* | 11/2014 | Fino | G01C 21/34 701/117 |
| 2015/0310738 | A1* | 10/2015 | Karacan | G08G 1/0112 701/117 |

* cited by examiner

*Primary Examiner* — Brian P Sweeney
(74) *Attorney, Agent, or Firm* — Gerard Messina

(57) ABSTRACT

A method is provided for ascertaining at least one road-related information item, including the following steps:
  ascertaining a position of a location on a road, starting from which a mobile user device of a communication network crossed the road, based on the position data of the user device,
  ascertaining a waiting time during which the user device had to wait at the location before the user device crossed the road,
  ascertaining a position of a light signal system as a road-related information item, based on the ascertained waiting time and the ascertained position.
A corresponding system is also provided, as well as a corresponding computer program.

16 Claims, 2 Drawing Sheets

METHOD AND SYSTEM FOR ASCERTAINING AT LEAST ONE ROAD-RELATED INFORMATION ITEM

FIELD OF THE INVENTION

The present invention relates to a method and a system for ascertaining at least one road-related information item. In addition, the present invention relates to a computer program.

BACKGROUND INFORMATION

For a proper navigation in road traffic, it is necessary, as a rule, to know a position of a light signal system. To be sure, navigation systems are known which include digital maps. These digital maps may be incomplete, however, or have errors in them.

Therefore, there exists a requirement for ascertaining a position of a light signal system, and particularly a phase of the light signal system (traffic-light phase).

SUMMARY

An object, on which the present invention is based, may therefore be seen in providing a method for ascertaining at least one road-related information item, which permits ascertaining a position of a light signal system as the road-related information item.

The object on which the present invention is based may also be seen in providing a corresponding system.

The object on which the present invention is based may also be seen in indicating a corresponding computer program.

According to one aspect, a method is provided for ascertaining at least one road-related information item, including the following steps:
- ascertaining a position of a location on a road, starting from which a mobile user device of a communication network crossed the road, based on position data of the user device,
- ascertaining a waiting time during which the user device had to wait at the location before the user device crossed the road,
- ascertaining a position of a light signal system as a road-related information item, based on the ascertained waiting time and the ascertained position.

According to another aspect, a system is provided for ascertaining at least one road-related information item, including:
- a processing device, which is developed, based on position data of a mobile user device of a communication network, to ascertain a position of a location on a road, starting from which the user device crossed the road,
- the processing device being developed to ascertain a waiting time during which the mobile user device had to wait at the location before the user device crossed the road;
- the processing device being developed to ascertain a position of a light signal system as the road-related information item, based on the ascertained waiting time and the ascertained position.

According to yet another aspect, a computer program is provided, which includes program code to execute the method according to the present invention when the computer program is run on a computer, especially on a processing device.

The present invention is particularly based on the realization that one must normally wait in front of a light signal system before being able to cross the road. Thus one may advantageously and simply infer the presence of a light signal system at the location or in the surroundings of the location. This knowledge may advantageously be used, for example, to update a digital map, or to verify or confirm a light signal system position that is already present in the digital map. Finally, a reliability of a navigation based on this digital map may thus be advantageously increased. In particular, this information about the presence of the light signal system may advantageously be made available to road users, so that they are able to adapt their navigation correspondingly in optimal fashion. The traffic flow on the road may thereby be optimized, for example. This may advantageously shorten the respective travel time of the individual road users. In the course of an appropriately adapted manner of driving towards the present light signal system, for example, the vehicle guidance may be adapted in such a way that fuel usage is able to be minimized.

According to one specific embodiment, a plurality of road-related information items may be ascertained. These may, in particular, be formed to be equal or preferably different.

According to one specific embodiment, the communication network may be a mobile radio network.

According to one specific embodiment, the communication network may be the Internet.

According to one specific embodiment, a plurality of mobile user devices may be provided. Embodiments in connection with one user device apply analogously for a plurality of user devices and vice versa. In this specific embodiment, that is, respective position data are available to the plurality of user devices. Thus, this means in particular that, for each user device, the location is ascertained based on his position data. In particular, for each user device, the respective waiting time is ascertained. The position of the light signal system is then particularly ascertained based on the respectively ascertained waiting times and the respectively ascertained positions. This then means, in particular, that in the case of a plurality of user devices, a statistical evaluation of the position data is carried out, so that the position of the light signal system is able to be ascertained especially reliably. The number of user devices required, so that one may infer the presence of a light signal system with a certain probability, depends on the specific individual case. The exact number particularly depends on a time interval during which the user devices have crossed the road. For instance, at least ten user devices must have crossed the road from the location, so that one may conclude statistically that there is a light signal system. Especially, at least a time period of 12 hours has to be observed, in order to conclude appropriately on the presence of a light signal system.

According to one specific embodiment, the mobile user device may be a mobile terminal, especially a mobile radio unit.

Using the formulation that the user device crosses the road particularly includes the case in which the user device is carried along by a user or a vehicle, which or who is crossing the road. A user or a vehicle is a road user.

According to one specific embodiment, it may be +provided that a user device speed be ascertained before the crossing and/or during the crossing and/or after the crossing, a type of light signal system being ascertained as a road-related information item based on the ascertained speed of the user device. The user device speed particularly corresponds to the speed of the user or of the vehicle who, or which, is crossing the road.

Different road users have different speeds. Road users may be vehicles, pedestrians or cyclists, for example. Vehicles may be passenger cars, trucks or motorcycles, for example. Since these road users carry the mobile user devices with them, it is thus known from the user device speed whether the mobile user device was being carried by a pedestrian, a vehicle driver or a cyclist. This means in particular that, as a function of a user device speed, a classification is carried out as to which kind of road user is involved, who is carrying the mobile user device with him. Thus, for example, at a user device speed between 3 km/h and 5 km/h, a pedestrian is involved. Thus, for example, at a user device speed between 5 km/h and 60 km/h, a vehicle driver is involved, for instance, a passenger car driver. At a user device speed between 5 km/h and 25 km/h, a cyclist is involved, for example.

According to a further specific embodiment, it may be provided that a crossing direction of the user device be ascertained, and, based on the ascertained crossing direction, the orientation of the light signal system is ascertained as the road-related information item.

This has, in particular, the technical effect of revealing for which travel direction or which traffic lane the light signal system is regulating traffic. In another specific embodiment it may be provided that, based on the ascertained waiting time, a duration of a red phase of the light signal system is ascertained as a road-related information item.

This has the technical effect, for example, of providing a simple possibility for determining the duration of the red phase.

According to another specific embodiment, it may be provided that a crossing time be ascertained which the user device requires for crossing the road.

This has the technical effect, for example, that an evaluation and a coordination of the phases of the light signal system are possible. In particular, a duration of a green phase is able to be optimized with a view to making it possible for a specific number of user devices to cross the road during the green phase.

According to another specific embodiment, it may be provided that a date on the ascertained waiting time is ascertained.

This has the technical effect, for instance, that an evaluation according to the time of day is possible. In particular, times of day may be detected at which the light signal system is out of operation. A non-operated light signal system may be recognized especially in that a waiting time is equal to zero or, for instance, less than the shortest waiting time during an operation of the light signal system. A date includes, for instance, a time of day, that is, generally a clock time, and/or a day of the week.

According to another specific embodiment, it may be provided that, in the case of a plurality of user devices, a time is ascertained that has passed between a first user device and a last user device that was still able to cross the road before an additional user device would have to wait again before crossing, whereby, based on the ascertained time, a duration of the green phase of the light signal system is ascertained as a road-related information item.

This, in particular, has the technical effect that a duration of the green phase is able to be ascertained.

According to the above explanations, it is thus made possible, in exemplary specific embodiments, to ascertain or determine phases of a light signal system (traffic-light phases), that is, particularly a red phase and/or a green phase, that is, particularly a respective duration of the phases.

According to another specific embodiment, it may be provided that a communication interface be provided for receiving the position data of the user device via the communication network. This, in particular, has the technical effect that a user device is able to transmit its position data directly to the system.

DETAILED DESCRIPTION

Figure 1:
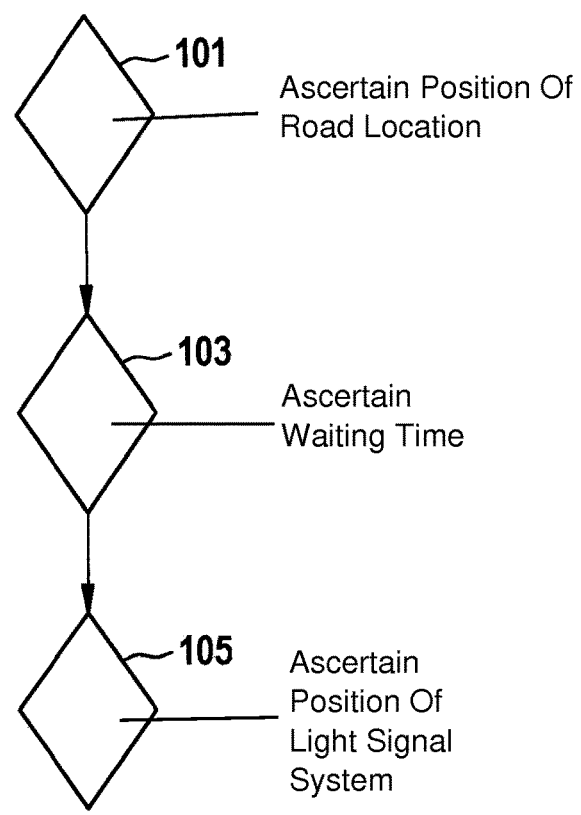
FIG. 1 shows a flow chart of a method for ascertaining at least one road-related information item.

FIG. 1 shows a flow chart of a method for ascertaining at least one road-related information item.

According to a step 101, a position is ascertained of a location on a road, starting from which a mobile user device of a communication network has crossed the road. This ascertainment is carried out based on position data of the user device. In a step 103, a waiting time is ascertained during which the user device had to wait at the location, before the user device crossed the road. In a step 105, a position is ascertained of a light signal system as a road-related information item, based on the ascertained waiting time and the ascertained position.

Figure 2:
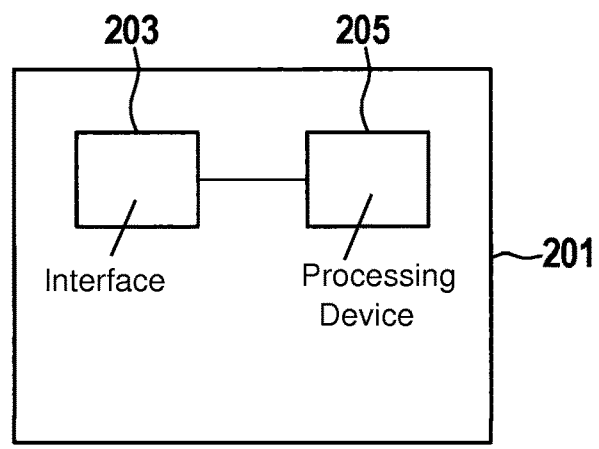
FIG. 2 shows a system for ascertaining at least one road-related information item.

FIG. 2 shows a system 201 for ascertaining at least one road-related information item.

System 201 includes a communication interface 203 for receiving position data of a mobile user device over a communication network. Furthermore, system 201 includes a processing device 205, which is developed to carry out the method according to the present invention. In one specific embodiment, which is not shown, it may be provided that system 201 does not include communication interface 203.

Figure 3:
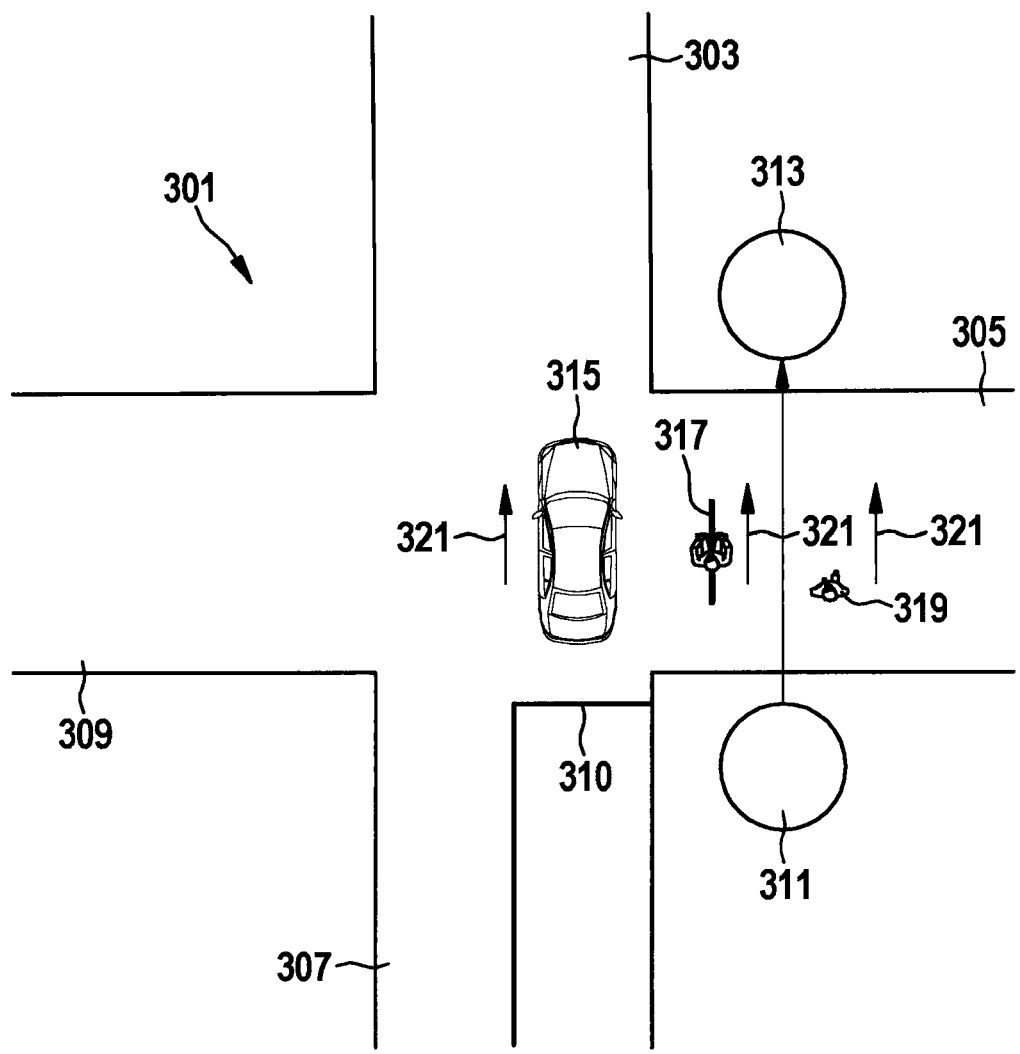
FIG. 3 shows an intersection.

FIG. 3 shows an intersection 301 having four intersecting roads 303, 305, 307 and 309. The case depicted is one of right-hand traffic. Reference numeral 310 points to a stop line of road 307 before intersection 301. Reference numeral 311 points to a first location before a crossing of road 305. The first location may particularly also be designated as location A and may be abbreviated as "A" below. Reference numeral 313 points to a second location, which is opposite to first location 311 and is located on the opposite side of road 305 with respect to first location 311. Second location 313 will thus be reached after crossing road 305. Second location 313 may also be designated as location B and may be abbreviated as "B" below. At stop line 310, a light signal system is provided which regulates traffic. The light signal system is not illustrated for reasons of clarity. On further roads 309, 303 and 305, light signal systems for traffic control may also be preferably provided.

What is shown schematically is a vehicle 315 which is in the process of crossing road 305 or the area of the intersection. Vehicle 315 may also be abbreviated as "X" below. Reference numeral 317 points to a schematically shown cyclist, which may also be abbreviated as "Y" below. Reference numeral 319 points to a schematically shown pedestrian, who may also be abbreviated as "Z" below. A direction of travel of these individual road users is shown by an arrow having reference numeral 321. This then means in particular that these individual road users intend to cross road 319 from A to B (for vehicle 315 this is, of course, related to road 307, for vehicle 315 is, after all, not permitted to travel on the sidewalk). Each of these road users, or at least one passenger of vehicle 315, includes at least one mobile user device, particularly a mobile terminal, for instance, a mobile radio unit. In other exemplary embodiments, the road users may cross other roads of intersection 301. The crossing shown in FIG. 3 is exemplary, but not restricting.

Each of the mobile user devices sends its instantaneous position during travel towards intersection 301, while crossing road 305, and also after crossing road 305 to a system according to the present invention, for instance system 201 of FIG. 2. Processing device 205 may then undertake the following steps, in particular:

Based on the waiting times of the abovementioned road users at intersection 301 (this applies to any intersections, road junctions and pedestrian crossings) over at least n user devices/users of the communication network at the same location, one may conclude that there exists a traffic-light system (light signal system). An existing digital map (for instance, a digital geographic map) is supplemented by this traffic-light information (light signal system information). n must be constituted so that a statistical statement may be made on an intersection/traffic light (traffic light=light signal system) over a certain time (for instance, the following estimate: 10 users at the same location per 12 h).

In case the existing digital map, for example, a digital geographic map, of a town, for example, already includes the traffic light information (there is a traffic-light system at this place or there is not), this is able to be confirmed via the present method, and the method is accelerated in providing informative value (the learning phase with respect to traffic-light systems is eliminated).

In addition, a distinction is preferably made whether a traffic light is crossed by a pedestrian or by a mobilized road user (vehicle, bicycle). This is first of all possible since the method runs permanently in the user device, for instance, the mobile terminal, and does not only work at the intersection. It is therefore known at what speed (for instance, 3 km/h to 5 km/h as a pedestrian or 5 km/h to for instance 60 km/h as a car driver or 5 km/h to 25 km/h as a cyclist) the road user moves before and after the crossing, and thus an inference is made regarding the type of propulsion used. The traffic-light system recognized is accordingly a pedestrian traffic light or a light signal system for vehicles.

According to one specific embodiment, the method further utilizes the GPS information or tracking information (position data of the user device), in order to define the crossing direction of the intersection/junction of the road and thus the orientation of the traffic light.

According to one specific embodiment, the method now generates one data set per known traffic light. Now, per intersection, a plurality of traffic light data sets may exist, such as from A to B and for pedestrians (Z, A→B), and motorized road users (X, A→B), in particular even cyclists as well, of a bicycle path running in parallel (Y, A→B). That is, per intersection, traffic light data sets are formed or ascertained, which in each case include a location from which the crossing begins, a location at which the crossing ends and a road user type (pedestrian, vehicle, cyclist . . . ).

According to one specific embodiment, the traffic light data sets are now statistically supplemented by the waiting times before a vehicle, a bicycle or a pedestrian had to wait, on average, in front of a red traffic light, before being able to cross it. In the case of a sufficient statistical minimum quantity, the waiting time of the red phase is thus able to be determined (from the waiting times of individual users at the same place/position, for instance, A as pedestrian Z).

In a further specific embodiment, the method supplements the traffic light data sets with the to duration of the green phase, that is, the duration between the first pedestrian (this applies also to any road users), who may be, for instance, a member of a social network, and the last pedestrian (who may also be a member of the social network), who was able to cross the intersection during a traffic-light phase. This is advantageously determined already during a traffic-light phase.

According to another specific embodiment, the method also still supplements the traffic light data sets by the duration of the crossing of each road user. This is advantageous information for later evaluations or coordinations of the traffic-light phases.

According to one specific embodiment, a broadening of the method includes an analysis with respect to changes depending on the time of day. Thus, changes depending on the time of day are preferably analyzed and also stored in the data set. The analysis may yield, for example, that the stopping phase at a traffic light between 22:00 o'clock and 6:00 o'clock is very long (for instance, 5 minutes), while between 6:00 o'clock and 22:00 o'clock it amounts to only 2 minutes.

In one specific embodiment, the method will also be broadened to the extent that, for example, times of the day are recognized at which the traffic light system is out of operation. It is recognized, for instance, that, between 0:00 o'clock and 5:00 o'clock in the morning, the light signal system is out of operation, since no waiting times/stop times of the user devices or cloud users result at the traffic light.

In summary, the present invention thus particularly includes the idea of correlating existing items of information about intersections, road junctions and/or pedestrian crossings having waiting times of user devices in front of a light signal system situated there with their current position locations, especially the GPS position, via a communication network. The user devices may share their position data, for example, with a social network, so that the social network is able to ascertain the items of information, for example.

What is claimed is:

1. A method for ascertaining at least one road-related information item, comprising:
   ascertaining, by a processing device, a position of a location on a road, starting from which a mobile user device of a communication network crossed the road, based on position data of the user device;
   ascertaining, by the processing device, a speed of the user device at least one of before the crossing, during the crossing, and after the crossing;
   ascertaining, by the processing device, a waiting time during which the user device had to wait at the location before the user device crossed the road; and
   ascertaining, by the processing device, a position of a light signal system as the road-related information item, based on the ascertained waiting time and the ascertained position;
   based on the ascertained user device speed, ascertaining, by the processing device, which type of traffic-light system, selected from a plurality of traffic-light system types, the light signal system is, the plurality of traffic-light system types including a pedestrian traffic light and a light signal system for vehicles; and
   updating a digital map with the road-related information item.

2. The method as recited in claim 1, further comprising:
ascertaining, by the processing unit, a crossing direction of the user device; and
based on the ascertained crossing direction, ascertaining, by a processing device, an orientation of the light signal system as another road-related information item.

3. The method as recited in claim 1, further comprising, based on the ascertained waiting time, ascertaining, by the processing device, a duration of a red phase of the light signal system as another road-related information item.

4. The method as recited in claim 1, further comprising ascertaining, by the processing device, a crossing time that a user requires for crossing the road.

5. The method as recited in claim 1, further comprising ascertaining, by the processing device, a date for the ascertained waiting time.

6. The method as recited in claim 1, further comprising:
in the case of a plurality of user devices, ascertaining, by the processing device, a time that has passed between a first user device and a last user device being still able to cross the road before an additional user device had to wait again before crossing; and
based on the ascertained waiting time, ascertaining, by the processing device, a duration of a green phase of the light signal system as another road-related information item.

7. The method as recited in claim 1, further comprising:
updating the digital map with the ascertained type of traffic-light system.

8. A system for ascertaining at least one road-related information item, comprising:
a processing device of the system that:
ascertains, based on received position data of a mobile user device of a communication network, a position of a location on a road, starting from which the user device crossed the road,
ascertains a speed of the user device at least one of before the crossing, during the crossing, and after the crossing;
ascertains a waiting time during which the mobile user device had to wait at the location before the user device crossed the road, and
ascertains a position of a light signal system as the road-related information item, based on the ascertained waiting time and the ascertained position;
based on the ascertained user device speed, ascertains which type of traffic-light system, selected from a plurality of traffic-light system types, the light signal system is, the plurality of traffic-light system types including a pedestrian traffic light and a light signal system for vehicles; and
update a digital map with the road-related information item.

9. A system as recited in claim 8, further comprising a communication interface for receiving the position data of the user device over the communication network.

10. The system as recited in claim 8, wherein the processing device further updates the digital map with the ascertained type of traffic-light system.

11. A non-transitory machine-readable memory medium storing a computer program for ascertaining at least one road-related information item, the computer program, when executed by a processing device, configured to cause:
ascertaining a position of a location on a road, starting from which a mobile user device of a communication network crossed the road, based on position data of the user device;
ascertaining a speed of the user device at least one of before the crossing, during the crossing, and after the crossing;
ascertaining a waiting time during which the user device had to wait at the location before the user device crossed the road; and
ascertaining a position of a light signal system as the road-related information item, based on the ascertained waiting time and the ascertained position;
based on the ascertained user device speed, ascertaining which type of traffic-light system, selected from a plurality of traffic-light system types, the light signal system is, the plurality of traffic-light system types including a pedestrian traffic light and a light signal system for vehicles; and
updating a digital map with the road-related information item.

12. The non-transitory machine-readable memory medium as recited in claim 11, wherein the computer program, when executed by a processing device, is further configured to cause:
updating the digital map with the ascertained type of traffic-light system.

13. A computer system for updating a digital map, comprising:
a processing device configured to process position data of a mobile user device, wherein the processing device is configured to carry out the following:
ascertain a position of a location on a road, starting from which the mobile user device of a communication network crossed the road, based on position data of the user device;
ascertain a speed of the user device at least one of before the crossing, during the crossing, and after the crossing;
ascertain a waiting time during which the user device had to wait at the location before the user device crossed the road;
ascertain the position of the light signal system, based on the ascertained waiting time and the ascertained position;
based on the ascertained user device speed, ascertain which type of traffic-light system, selected from a plurality of traffic-light system types, the light signal system is, the plurality of traffic-light system types including a pedestrian traffic light and a light signal system for vehicles; and
update the digital map with the ascertained position of the light signal system.

14. The computer system as recited in claim 13, further comprising:
a communication interface for receiving the position data of the mobile user device over the communication network,
wherein the communication interface communicates the received position data of the mobile user device to the processing device, and
wherein the communication network is a mobile radio network or the Internet.

15. The computer system as recited in claim 13, wherein the processing device is further configured to update the digital map with the ascertained type of traffic-light system.

16. A method for ascertaining at least one road-related information item, comprising:
ascertaining, by a processing device, a position of a location on a road, starting from which a mobile user device of a communication network crossed the road, based on position data of the user device;

ascertaining, by the processing device, a speed of the user device at least one of before the crossing, during the crossing, and after the crossing;

ascertaining, by the processing device, a waiting time during which the user device had to wait at the location before the user device crossed the road; and ascertaining, by the processing device, a position of a light signal system as the road-related information item, based on the ascertained waiting time and the ascertained position;

based on the ascertained user device speed, ascertaining, a road user type from a plurality of road user types, the plurality of road user types including a vehicle and a pedestrian; and updating a digital map with the road-related information item based on the ascertained road user type.

* * * * *